United States Patent [19]
Sada et al.

[11] 4,360,091
[45] Nov. 23, 1982

[54] TRACTOR TRANSMISSION

[75] Inventors: Kenzo Sada; Mitsuo Watashi, both of Sakai, Japan

[73] Assignee: Kubota, Ltd., Osaka, Japan

[21] Appl. No.: 70,462

[22] Filed: Aug. 28, 1979

[30] Foreign Application Priority Data

Sep. 4, 1978 [JP] Japan ............................ 53/122262[U]

[51] Int. Cl.³ ...................... F16D 67/00; F16D 57/02; F16H 37/06
[52] U.S. Cl. .................... 192/4 B; 74/15.63; 188/290
[58] Field of Search ...................... 74/15.4, 15.6, 15.63, 74/665 G, 15.66, 665 GA, 15.86, 665 F, 11, 15.2, 467, 468, 339, 411.5, 342; 474/93; 415/122 R, 123; 188/83, 290; 192/4 B, 12 A, 20, 4 A; 366/324, 302, 303

[56] References Cited

U.S. PATENT DOCUMENTS

| | | | |
|---|---|---|---|
| 456,839 | 7/1891 | Oster | 366/302 |
| 1,047,948 | 12/1912 | Karminski et al. | 188/290 X |
| 2,420,360 | 5/1947 | Deming | 188/290 X |
| 2,448,822 | 9/1948 | Pinardi et al. | 74/15.6 X |
| 2,653,487 | 9/1953 | Martin et al. | 192/4 B X |
| 2,827,989 | 3/1958 | Christenson | 192/4 B |
| 2,899,034 | 8/1959 | Hubert | 74/15.66 X |
| 3,180,571 | 4/1965 | Caroli et al. | 192/12 A X |
| 3,733,912 | 5/1973 | Murayama et al. | 74/15.86 X |
| 4,108,291 | 8/1978 | Zenker | 74/411.5 X |
| 4,192,410 | 3/1980 | Poirier | 74/411.5 X |

FOREIGN PATENT DOCUMENTS

| | | | |
|---|---|---|---|
| 497522 | 12/1919 | France | 366/324 |
| 589103 | 2/1959 | Italy | 74/15.86 |
| 49-21926 | 6/1974 | Japan . | |
| 223614 | 11/1968 | U.S.S.R. | 192/4 B |

*Primary Examiner*—Allan D. Herrmann
*Attorney, Agent, or Firm*—Edwin E. Greigg

[57] ABSTRACT

A tractor transmission having an input shaft, a PTO system transmission shaft disposed thereunder, a gear-type speed change mechanism for changing the number of rotations of the input shaft, and oil reservoir. A gear in engagement with the gear in said gear-type speed change mechanism is rotatably disposed at said PTO system transmission shaft and blades are disposed at the boss of this first-mentioned gear. At least one side of each of said blades is opened toward said oil reservoir. Lubricating oil in said oil reservoir is utilized as resistance to the blades, thereby to stop the rotation of the gear-type speed change mechanism otherwise caused due to the force of inertia.

5 Claims, 4 Drawing Figures

TRACTOR TRANSMISSION

BACKGROUND OF THE INVENTION

The present invention relates to a tractor transmission in which engine output is transmitted to the gear-type speed change mechanism in the transmission case, through transmission clutch means.

There has conventionally been a tendency that, when the gear-type speed change mechanism is operated with the transmission clutch means turned OFF, this gear-type speed change mechanism cannot immediately be stopped rotating due to the force of inertia. Therefore, gear engagement has not been switched smoothly, and if gear engagement is forcibly switched, there has been a risk of the gears breaking.

SUMMARY OF THE INVENTION

In view of the defects of prior art above-mentioned, it is an object of the present invention to provide a tractor transmission in which, with the transmission clutch means turned OFF, the gear-type speed change mechanism is not rotated by the force of inertia, thereby to permit the speed change gear engagement to be smoothly switched.

In order to achieve the above object, the tractor transmission according to the present invention has an input shaft, a PTO system transmission shaft disposed thereunder, a gear-type speed change mechanism for changing the number of rotations of the input shaft and oil reservoirs, and is characterized by comprising a transmission gear secured to the input shaft, a gear having a boss and rotatably disposed at the PTO system transmission shaft so as to mesh with the transmission gear, and a plurality of blades disposed at the boss of the gear, at least one side of each of said plurality of blades being opened toward the oil reservoir.

Namely, lubricating oil in the oil reservoir may be utilized as resistance applied to the blades, thereby to impart resistance to the gear-type speed change mechanism through the gear disposed integrally with the blades. Accordingly, this prevents the rotation of the gear-type speed change mechanism otherwise caused by the force of inertia with the clutch means turned OFF, thereby to permit the speed change gear engagement to be smoothly switched.

Furthermore, at least one side of each of the blades is opened toward the oil reservoir, so that, after oil among a plurality of blades has been forced out when the blades are rotated at high speeds, oil may easily enter from these opened sides of the blades into the spaces among the blades. Thus, there are no cases where the amount of oil among the blades becomes small, and therefore sufficient resistance may always be given to the blades. This provides an advantage to stop more securely and immediately the rotation of the gear-type speed change mechanism otherwise caused by the force of inertia.

Other objects and advantages of the present invention will be apparent from the following detailed description.

BRIEF DESCRIPTION OF THE DRAWINGS

The present invention will be then described by way of example, with reference to the accompanying drawings, in which:

FIG. 4 is a perspective view of a modification illustrating notches in the blades of the blade assembly.

DETAILED DESCRIPTION OF THE PREFERRED EMBODIMENTS

Figure 1:
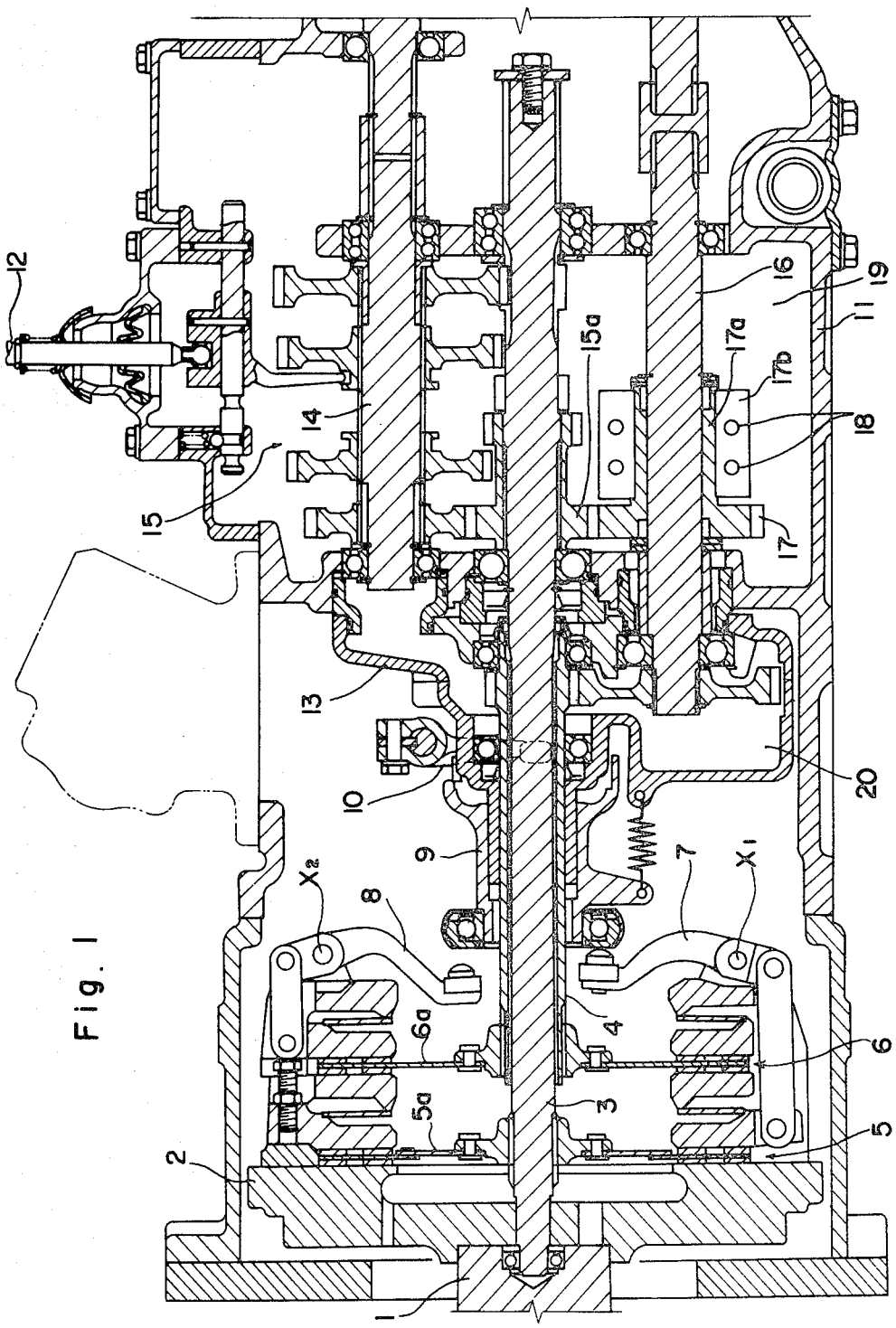
FIG. 1 is a longitudinal section view of a tractor transmission according to the present invention.

In FIG. 1 showing a transmission for an agricultural tractor, a flywheel 2 is secured to an engine output shaft 1 and a cylindrical input shaft for the PTO system 4 is rotatably inserted onto an input shaft for the travelling system 3. Connected to the front surface of a first transmission case 11 of a large size is a second transmission case 13 of a small size.

Friction plates 5a and 6a are splined to the travelling system input shaft 3 and the PTO system input shaft 4, respectively. These friction plates 5a and 6a are spring-loaded toward the flywheel 2, thus forming travelling system clutch means 5 and PTO system clutch means 6. These clutch means 5 and 6 are adapted to be turned OFF when operation arms 7 and 8 pivoted to the flywheel 2 are pushed in the axial direction and swung around supporting points $X_1$ and $X_2$, respectively.

A cylindrical member 9 fitted onto the second transmission case 13 is so formed that one end of this cylindrical member 9 may come in contact with the operation arms 7 and 8. The cylindrical member 9 is further formed so that, with the clutch means 5 and 6 turned ON, the distance between said one end of the cylindrical member 9 and the operation arm 7 of the travelling system clutch means 5 is smaller than the distance between said one end of the cylindrical member 9 and the operation arm 8 of the PTO system clutch means 6.

When the cylindrical member 9 is moved by a shift fork 10, the operation arm 7 is firstly swung to declutch the travelling system clutch means 5, and the operation arm 8 is then swung to declutch the PTO system clutch means 6. Although not shown, the first shift fork 10 is adapted to be swung by foot-operation of a foot pedal.

The travelling system input shaft 3 passes through the second transmission case 13 to extend into the first transmission case 11 and is adapted to transmit engine power to a travelling system transmission shaft 14 supported at the upper portion in the first transmission case 11, through a gear-type speed change mechanism 15. Engine power thus transmitted to the travelling system transmission shaft 14 will further be transmitted to vehicle wheels (not shown) through a suitable interlocking mechanism. A speed change lever 12 is disposed for operating the gear-type speed change mechanism 15.

The PTO system input shaft 4 extends into the second transmission case 13 and is adapted to transmit engine power to the extending end of a PTO system transmission shaft 16 extended from the first transmission case 11 into the second transmission case 13, through a gear interlocking mechanism 17.

Engine power thus transmitted to the PTO system transmission shaft 16 will further be transmitted to a PTO shaft (not shown) through a suitable interlocking mechanism.

Disposed in the first transmission case 11 and the second transmission case 13 are oil reservoirs 19 and 20, respectively, for reserving lubricating oil for lubricating various transmission mechanisms within the first and second transmission cases 11 and 13.

A gear 17 is secured on the PTO system transmission shaft 16 in such a manner as to be rotatable around the axis thereof, said gear 17 is interlockingly meshed with a gear 15a which is secured to the travelling system input shaft 3 and serves as a speed change gear in the travelling speed change mechanism 15.

Figure 2:
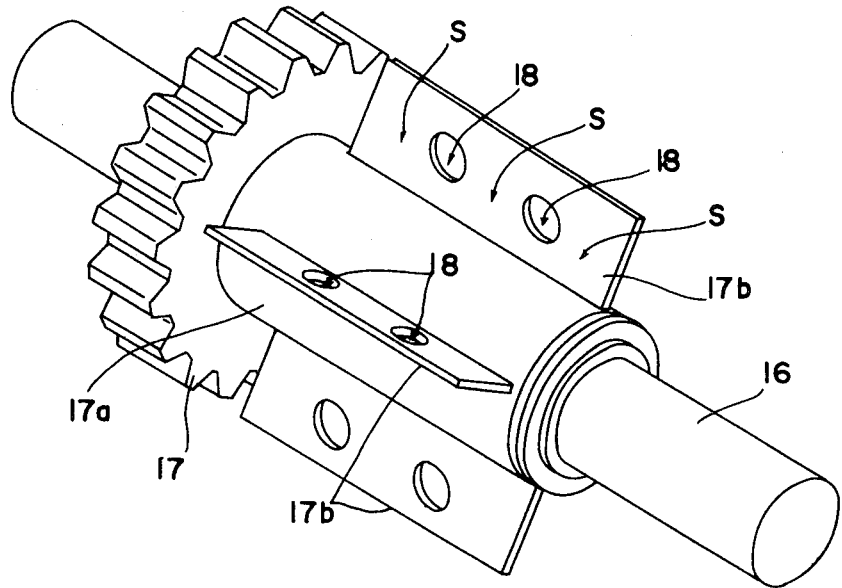
FIG. 2 is a perspective view of a blade assembly used in the tractor transmission in FIG. 1.

As shown in FIG. 2, this gear 17 is provided at the boss 17a thereof with a plurality of blades 17b vertically disposed at suitable intervals in the circumferential direction of the shaft 16. Formed in each of these blades 17b are two bores 18 directed in the circumferential direction of the boss 17a at suitable intervals in the axial direction, said bores 18 being formed as spaces permitting the lubricating oil to flow in the rotation direction of the blades 17. Surfaces areas S are formed at each of the blades 17b as divided by two bores 18 and are adapted to press and push the lubricating oil in the oil reservoir 19 in the first transmission case 11. When these surface areas S are moved while pressing the lubricating oil, resistance is applied to these areas S and such resistance will become resistance to the travelling system input shaft 3. The construction in which lubricating oil is flowed passing through the bores 18, permits to reduce jumping-up of the lubricating oil.

In the embodiment discussed hereinbefore, any provision is not specially made so as to apply resistance to the travelling system transmission shaft 14, since this transmission shaft 14 has a tendency to be stopped rotating immediately by the interlocking thereof with the vehicle wheels. However, it may be possible to apply resistance also to this transmission shaft 14.

Instead of the blades 17b, for example brushes may be used with the same effect produced. Furthermore, the same effect may also be expected from the blades 17b in which notches 22 are formed instead of the bores 18, as shown in FIG. 4.

In order to achieve the object similar to that of the present invention, it would also be possible to so arrange that a plurality of disks are rotated around the centers thereof and, by utilizing viscous frictional resistance applied to these disks when the disk sides are moved while being in contact with lubricating oil, resistance is applied to the gear-type speed change mechanism 15.

Figure 3:
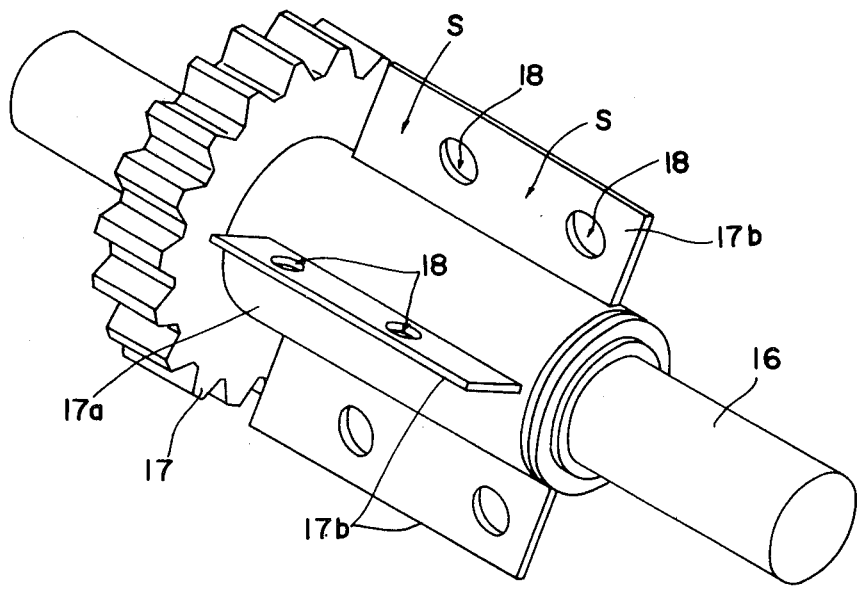
FIG. 3 is a perspective view of another blade assembly having therein bores at positions different from those in FIG. 2.

As shown in FIG. 3, the bores 18 in one blades 17b may get out of position with respect to the bores 18 in the adjacent blades 17b in the circumferential direction of the transmission shaft 16, thereby to provide large resistance while permitting the flow of the lubricating oil.

Although in the embodiments discussed hereinbefore the pressing spaces S and the bores 18 are disposed side by side with respect to the axial direction, they may also be disposed side by side in the radial direction.

In any cases, since the lubricating oil is forcibly flowed toward the back sides of the pressing areas S through the bores 18, large rotary resistance may be provided with spiral resistance effectively utilized.

We claim:

1. A tractor transmission comprising:
   an input shaft (3) which receives driving power from an engine;
   a gear type speed change mechanism 15 including a traveling system transmission shaft 14, said gear type speed change mechanism 15 operatively connecting said transmission shaft (14) to said input shaft (3), said speed change mechanism (15) including a transmission gear (15a) fixed to said input shaft (3) for operating said transmission shaft (14), said transmission gear 15a having a diameter which is larger than any other gear of said input shaft (3);
   a power takeoff system transmission shaft (16) disposed below said input shaft (3);
   gear means for rotating said power takeoff system transmission shaft 16;
   a transmission case 11 housing and supporting therein said input shaft (3), said traveling system transmission shaft (14) and said power takeoff system transmission shaft (16), said transmission case 11 including a lubricating oil reservoir (19) in a lower portion thereof relative to said transmission shaft (16);
   said transmission gear (15a) being disposed on said input shaft (3) adjacent one wall defining said oil reservoir (19);
   a freely rotatable gear (17) mounted on said power takeoff system transmission shaft (16), said freely rotatable gear 17 being in constant mesh with said transmission gear (15a) and disposed adjacent said one wall defining said oil reservoir (19), said gear 17 including a boss portion (17a) disposed on said gear (17) on a side opposite from said one wall defining said reservoir; and
   a plurality of axially aligned substantially radially extending blades (17b) mounted perepherially on said boss portion (17a) in spaced relationship; and
   positioned to be entirely immersed in a lubricating oil in said reservoir (19), each of said blades including openings therein through which oil may flow;
   whereby spacings between said blades (17b) provide openings to any lubricating oil in at least one direction parallel to a rotational axis of said blades and in a direction away from said one wall defining said oil reservoir (19).

2. A transmission as claimed in claim 1 wherein:
   said openings in said blades (17b) are notches along the outer edge.

3. A transmission as claimed in claim 1 wherein:
   each of said blades (17b) include at least one opening in the form of a bore (18).

4. A transmission as claimed in claim 3 wherein:
   said openings in said blades are in alignment axially.

5. A transmission as claimed in claim 3 wherein:
   said openings in said blades (17b) are offset axially.

* * * * *